US011948540B2

(12) United States Patent
Klukosky

(10) Patent No.: US 11,948,540 B2
(45) Date of Patent: Apr. 2, 2024

(54) METHOD FOR MANUFACTURING MUSICAL INSTRUMENT STRINGS AND MUSICAL INSTRUMENT STRINGS

(71) Applicant: DR Music, Inc., Westwood, NJ (US)

(72) Inventor: Thomas Klukosky, West Milford, NJ (US)

(73) Assignee: DR Music, Inc., Westwood, NJ (US)

( * ) Notice: Subject to any disclaimer, the term of this patent is extended or adjusted under 35 U.S.C. 154(b) by 135 days.

(21) Appl. No.: 17/310,101

(22) PCT Filed: Jan. 17, 2020

(86) PCT No.: PCT/US2020/013993
§ 371 (c)(1),
(2) Date: Jul. 16, 2021

(87) PCT Pub. No.: WO2020/150550
PCT Pub. Date: Jul. 23, 2020

(65) Prior Publication Data

US 2022/0093067 A1 Mar. 24, 2022

Related U.S. Application Data

(60) Provisional application No. 62/798,067, filed on Jan. 29, 2019, provisional application No. 62/794,224, filed on Jan. 18, 2019.

(51) Int. Cl.
*G10D 3/22* (2020.01)
*G10D 3/10* (2006.01)

(52) U.S. Cl.
CPC ................ *G10D 3/22* (2020.02); *G10D 3/10* (2013.01)

(58) Field of Classification Search
CPC ............... G10D 3/22; G10D 3/10; G10D 3/00
See application file for complete search history.

(56) References Cited

U.S. PATENT DOCUMENTS 3,099,595 A 7/1963 Allbaugh
4,499,144 A 2/1985 van Rijswijk
(Continued)

FOREIGN PATENT DOCUMENTS

AT 15509 U1 * 9/2017 .............. G10D 3/10
KR 20120004908 U 7/2012
WO 2020150550 A1 7/2020

OTHER PUBLICATIONS

International Search Report for PCT/US2020/013993 dated Mar. 23, 2020.
Written Opinion for PCT/US2020/013993 dated Mar. 23, 2020.

*Primary Examiner* — Kimberly R Lockett
(74) *Attorney, Agent, or Firm* — Brian Roffe

(57) ABSTRACT

Method for manufacturing a musical instrument string includes positioning an elongate wrap wire in a position to be wound about an elongate core wire having a round cross-sectional shape, the core wire including a core, a coating surrounding the core and a cylindrical outer surface. Winding of the wrap wire about the core wire is performed under winding conditions to cause the wrap wire to form a helical impression in the coating in which the wrap wire is situated. Material of the coating is selected to enable the coating to flow and form the impression and move upward into spaces between adjacent wrap wire windings. The winding conditions include tension on the core wire, tension on the wrap wire, winding speed and a temperature to which the core wire and/or wrap wire are heated. Glue or another adhesive is not used to bond the wrap wire and the core wire.

20 Claims, 4 Drawing Sheets

(56) References Cited

U.S. PATENT DOCUMENTS

| | | | | |
|---|---|---|---|---|
| 4,539,228 | A | 9/1985 | Lazarus | |
| 5,578,775 | A | 11/1996 | Ito | |
| 5,601,762 | A | 2/1997 | Ferrari et al. | |
| 6,348,646 | B1 * | 2/2002 | Parker | G10D 3/10 84/297 S |
| 6,528,709 | B2 | 3/2003 | Hebestreit et al. | |
| 7,531,730 | B2 | 5/2009 | Everly | |
| 7,608,766 | B2 | 10/2009 | Shlesinger | |
| 8,183,448 | B2 | 5/2012 | Mueller-Zierach et al. | |
| 8,487,168 | B1 | 7/2013 | Klukosky | |
| 8,957,293 | B2 | 2/2015 | Jolk et al. | |
| 9,355,621 | B2 | 5/2016 | Nesbitt | |
| 9,424,819 | B1 * | 8/2016 | Jones | G10D 3/10 |
| 9,502,008 | B2 | 11/2016 | Everly | |
| 9,734,803 | B2 | 8/2017 | Klanner et al. | |
| 2002/0136893 | A1 | 9/2002 | Shlesinger | |
| 2006/0174745 | A1 | 8/2006 | D'Addario | |
| 2008/0236361 | A1 | 10/2008 | Tambara et al. | |

* cited by examiner

METHOD FOR MANUFACTURING MUSICAL INSTRUMENT STRINGS AND MUSICAL INSTRUMENT STRINGS

TECHNICAL FIELD

The invention relates generally to methods for manufacturing musical instrument strings and musical instrument strings manufactured by the method.

BACKGROUND ART

Musical instrument strings, hereinafter referred to as strings, are often made with a core wire and a wrap wire wound around the core wire. In one prior art construction of a string 10 shown in FIG. 1, a core wire 12 has a circular cross-sectional shape, i.e., referred to as a round core wire, and a wrap wire 14 wound around the core wire 12 such that wrap wire 14 is contact with the outer surface of the core wire 12. A string 10 with a round core wire 12 may be made by attaching a ball-end to the core wire, which is commonly made from high strength carbon steel, stainless steel etc. The ball-ended round core wire 12 is provided with either a flattened area or glued area applied to a location on the core wire 12 outside of the playing area of the string to enable the wrap wire 14 to be anchored to the core wire 12 by biting into the square corners of the core wire 12 or by adhesion. Then, the ball-ended core wire 12 is put onto a string winding machine (not shown but well known to those skilled in the art of string manufacturing) and brought to tension. The wrap wire 14 is then turned onto the core wire 12 starting at the ball-end anchoring point through the flattened or glued section of the string. The tension is released from the string 10 and the string 10 is completed.

Another type of prior art string 16 is shown in FIG. 2 and includes a core wire 18 having a hexagonal cross-sectional shape, i.e., often referred to as a hex core. In a string 16 with a hexagonal core wire 18, the round outer wrap wire 14 is coiled around the hexagonal core wire 18 and during winding of the wrap wire 14 around the core wire 18, the outer wrap wire 14 bites into corners of the hexagonal core wire 18 anchoring the wrap wire 14 to the core wire 18 through the entire string 16.

A disadvantage of string 16 with a hexagonal core wire 18 is that plating on the hexagonal core wire 18 and wrap wire 14 are damaged during the manufacturing process, and voids 20 are inevitably created between the wrap wire 14 and the flat sides of the hexagonal core wire 18. These voids may be detrimental to the quality of the sound produced using the string 16, the longevity of the string 16 and/or the durability of the string 16.

There are advantages of strings 10 with round core wires 12 over strings 16 with hexagonal core wires 18. For example, with respect to the sound quality produced using the strings, it is thought by many people that the sound produced by a string with a round core wire is more appealing than the sound produced by a string with a hexagonal core because of, for example, the way the strings vibrate. With respect to flexibility, many people feel that the string with a round core wire is more flexible than a string with a hexagonal core wire because the wrap wire can rotate on the round core wire, whereas such rotation is reduced and even eliminated in a string with a hexagonal core wire because of the flat anchoring surface.

Yet another advantage relates to longevity in that a string with a round core provides for complete contact between the outer wrap wire and the round core wire, as shown in FIG.

1, which reduces the ability of foreign materials to enter between the core and wrap wires. By contrast, a string with a hexagonal core wire has voids 20 between the wrap and core wires where the flat sides are (see FIG. 2).

Nevertheless, there are some disadvantages of a string with a round core wire. For example, during manufacture, if the anchor is cut off during installation of the string in the string winding machine, before the string is strung onto an instrument from the flattened or the ball-ended section, the outer wrap wire can become loose from the core wire. Therefore, the installer of the string must create a new anchor by bending and flattening the string before the cutting. Also, when the tension is removed from the string during its manufacture, the coiled outer wrap wire compresses on itself. Then, when bringing the string up to pitch during installation, the wrap wire will decompress along the length of the string, and such decompression could be uneven. Still another disadvantage is that there may be more weight in one section of the string than another, which can cause intonation issues with the string during use and it may therefore be unbalanced.

DISCLOSURE OF THE INVENTION

It is an object of at least one embodiment of the present invention to provide a new and/or improved method for manufacturing strings for musical instruments, and strings manufactured by such a method.

It is another object of at least one embodiment of the present invention to provide a method for manufacturing strings for musical instruments that overcome one or more disadvantages of prior art string manufacturing techniques including but not limited to those mentioned above, and strings manufactured by such a method.

It is another object of at least one embodiment of the present invention to provide a method for manufacturing strings for musical instruments that enables a wrap wire to be wound about a core wire and form the string without the use of glue or adhesive to bond the wrap wire to the core wire, and strings manufactured by such a method.

It is still another object of at least one embodiment of the present invention to provide a method for manufacturing strings for musical instruments that does not require the use of an anchor in the manufacture of a string with a round core wire, and strings manufactured by such a method.

It is yet another object of at least one embodiment of the present invention to provide a method for manufacturing strings for musical instruments that avoid producing an unbalanced string, and strings manufactured by such a method.

It is yet another object of at least one embodiment of the present invention to provide a method for manufacturing strings for musical instruments that provides a coating that protects a core wire of the string while protecting the string from galvanic effect, and strings manufactured by such a method.

It is yet another object of at least one embodiment of the present invention to provide a method for manufacturing strings for musical instruments that produces a string wherein the ability of foreign material to enter between windings of the wrap wire about the core wire is reduced and preferably eliminated, and strings manufactured by such a method.

It is yet another object of at least one embodiment of the present invention to provide a method for manufacturing strings for musical instruments that produces a string with increased flexibility relative to current strings and an improved sound quality, and strings manufactured by such a method.

An exemplifying, non-limiting method for manufacturing a musical instrument string in accordance with the invention includes positioning an elongate wrap wire in a position to be wound about an elongate, round core wire, the core wire including a core and a coating surrounding the core and having an outer cylindrical surface, and performing the winding of the wrap wire about the core wire using, for example, a string winding machine, under selected winding conditions to cause the wrap wire to form a helical impression in the coating, the wrap wire being seated in the helical impression in the final state of the string. The material and/or thickness of the coating is/are selected to enable the coating to flow during string manufacture, i.e., at least during winding of the wrap wire about the core wire, and form the helical impression and move upward into spaces between adjacent windings of the wrap wire. The core wire preferably has a round cross-sectional shape, thereby providing the advantages of a string with a round core wire mentioned herein.

Winding conditions that may be varied in methods of the invention include, but are not limited to tension on the core wire, tension on the wrap wire and winding speed. Other winding conditions are also envisioned to be varied to achieve the objects of the invention. In one embodiment, it is possible to select these winding conditions to cause the wrap wire to coil about the core wire without penetrating the coating entirely at any location to thereby prevent contact between the wrap wire and the core of the core wire (that portion of the core wire surrounded by the coating). Indeed, this may be considered a preferred embodiment wherein the coating is only partly removed (pushed aside to form ridges) at any location while at least a portion of the thickness of the coating remains between the core of the core wire and the wrap wire, and which smallest thickness of the coating forms the base of a helical impression or channel extending along the length of the core wire, i.e., in the axial or longitudinal direction of the core wire which is the axial or longitudinal direction of the string.

A musical instrument string in accordance with the invention is preferably produced by the method above and therefore includes an originally elongate and straight wrap wire, and an elongate core wire having a round cross-sectional shape. The core wire includes a core and a coating surrounding the core. The coating includes a helical impression in which the wrap wire is situated to form it with a helical shape. The core may be made from various materials, including but not limited to, phosphor bronze, brass, copper, hi-carbon steel, lo-carbon steel, stainless steel, nickel-plated steel, cobalt, silver-plated steel, silver-plated copper, aluminum, Monel or Pure Nickel, or other materials. The wrap wire may be a wire made from the same or different materials.

Objects, advantages and features of the present invention will be understood by reference to the following specification in conjunction with the annexed drawings, wherein like parts have been given like numbers.

DESCRIPTION OF THE DRAWINGS

The invention, together with objects and advantages thereof, may best be understood by reference to the following description taken in conjunction with the accompanying drawings wherein like reference numerals identify like elements.

BEST MODE FOR CARRYING OUT INVENTION

Figure 3:
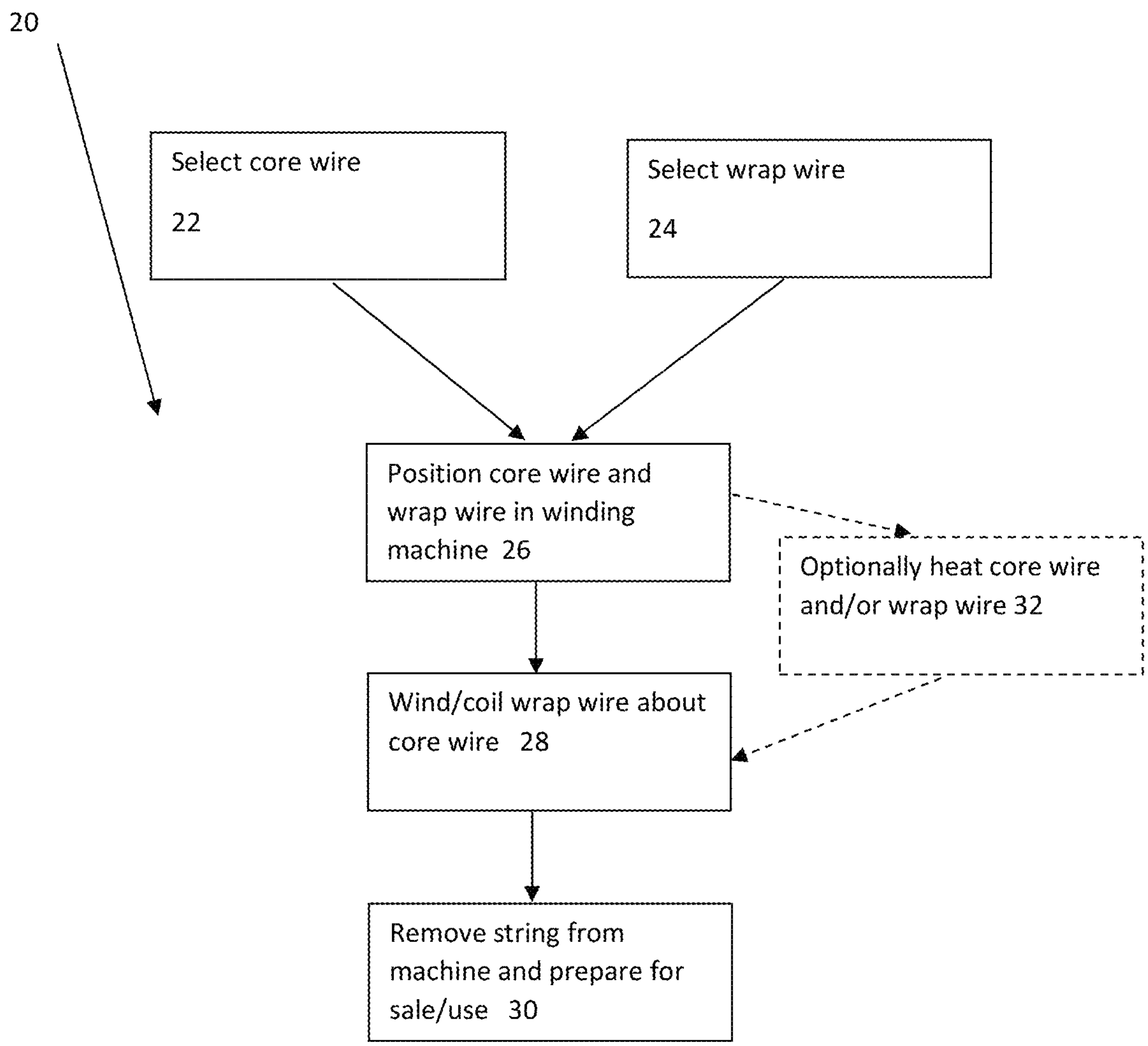
FIG. 3 is a flow chart of a method in accordance with the invention.

Referring to the accompanying drawings wherein like reference numerals refer to the same or similar elements, FIG. 3 is a flow chart showing main steps in an exemplifying method 20 for manufacturing strings in accordance with the invention. The listed steps are not exclusive and other steps may be performed in a method in accordance with the invention, and possibly in a different order. However, the method may be limited only to these steps and to no other significant steps.

Figure 4:
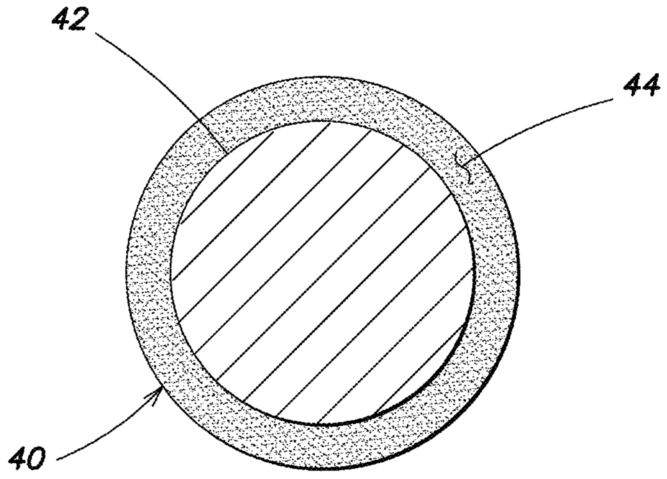
FIG. 4 is a cross-sectional view of a core wire of a string produced by the method in accordance with the invention.
Figure 5:
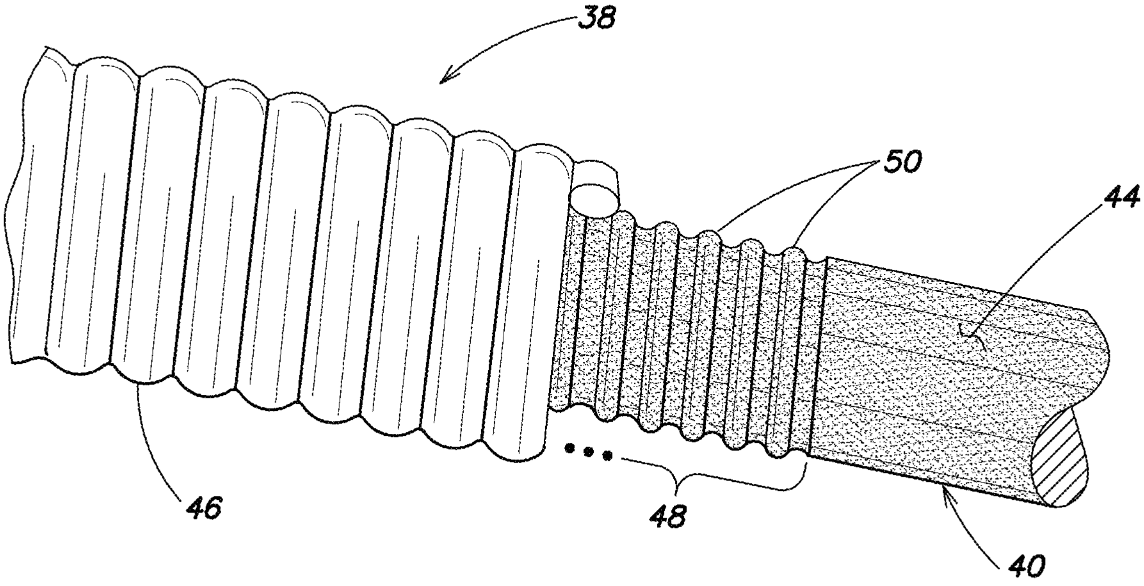
FIG. 5 is a view of the string produced by the method in accordance with the invention.

The first preliminary step 22 in the method 20 is to select the elongate core wire 40 to be used in the string 38 (see FIG. 5). Generally, any known core wire currently used in the manufacture of strings may be used in the invention, preferably with a round cross-sectional shape to optimize the advantages of the string produced by the method in view of the known advantages of a string with a round core wire. The core wire 40 is often elongate and straight and includes an elongate core 42 typically made of metal and a coating 44 on the core 42, see FIG. 4. The core 42 may also have a round cross-sectional shape, in which case the coating 44 has a uniform thickness around the core 42. Alternatively, if the core 42 does not have a round cross- sectional shape, the thickness of the coating 44 may vary to provide the core wire 40 with the round cross-sectional shape. In either case, the core wire 40 has a cylindrical outer surface and presents itself as a round core wire. Exemplifying, non-limiting materials for the core 42 include phosphor bronze, brass, copper, hi-carbon steel, lo-carbon steel, stainless steel, nickel-plated steel, cobalt, silver-plated steel, silver-plated copper, aluminum, Monel or Pure Nickel, and the like.

An important aspect of the invention is that it must be possible to make an impression in the coating 44. To this end, the coating 44 may be made of various types of plastics that can flow during the wrap wire winding process, for example, when sufficient pressure is exerted during the coiling of the wrap wire about the core wire. The thickness of the coating 44 may be in a range from about 0.00015 inches to about 0.0008 inches. A specific thickness and material composition of the coating 44 may be ascertained by those skilled in the art to which this invention pertains in view of the disclosure herein. The coating 44 may be made of a homogenous material or multiple materials.

The second preliminary step 24 in the method 20 is to select the elongate wrap wire 46 to be used in the string 38. Note that steps 22, 24 may be performed in the reverse order or simultaneously, or by different entities. It is possible that a robot or other automated machine can perform the wire selections based on user input. That is, different wires may be provided in a repository or storage facility and a robot programmed to pick one wire for use as the core wire and another wire for use as the wrap wire. Of course, manual selection is also a possibility.

Exemplifying, non-limiting materials for the wrap wire 46 include phosphor bronze, brass, copper, hi-carbon steel, lo-carbon steel, stainless steel, nickel-plated steel, cobalt, silver- plated steel, silver-plated copper, aluminum, Monel or Pure Nickel, and the like. The material for the wrap wire 46 may be the same as or different than the material used for the core 42.

The wrap wire 46 is optionally coated. It is not necessary to provide a coating on the wrap wire 46 and there are thus some embodiments wherein the wrap wire 46 is coated with a coating known to those skilled in the art to which this invention pertains and other embodiments wherein the wrap wire 46 is not coated. If coated, the wrap wire 46 may be coated before or after it is wound about the core wire 40.

Once the core wire 40 and wrap wire 46 are selected in steps 22, 24, respectively, they are brought to a string winding machine, which is a known machine used to manufacture strings, whether musical instrument strings or other wrapped strings.

The core wire 40 is placed into the position to be wrapped and the wrap wire 46 is placed into the position to be wound about the core wire 40, step 26. The manner in which these wires are positioned in the winding machine is known to those skilled in the art of using musical instrument string manufacturing machines. The invention is not limited to using any specific winding machine and any type of winding machine may be used provided the winding machine is able to generate winding conditions that enable the formation of the imprint, channel or impression in the coating 44 of the selected core wire 40 during winding of the wrap wire 46 about the core wire 40.

The next step 28 is to wind the wrap wire 46 about the core wire 40. This winding step is critical in the invention because it is necessary to provide or generate the winding conditions in order to enable the winding of the wrap wire 46 to form an impression or imprint in or on the coating 44 of the core wire 40. Generally, the wrap wire 46 is wound or coiled onto a coated core wire 40 at high speeds and tension to make a hard impression into the coating 44 on the core wire 40, preferably without penetrating the coating 44 down to the metal core 42.

By maintaining at least some of the coating 44 about the core 42, the core 42 is protected. The smallest thickness of the coating 44 that remains between the wrap wire 46 and the core 42 may be determined by assessing the properties of the string 38 sought to be manufactured and adjusting the winding process to optimize the smallest remaining thickness between the wrap wire 46 and the core 42. It is evident that the thickness of the coating 44 will vary along the length of the core wire 40, both in the axial direction and the circumferential direction.

Figure 1:
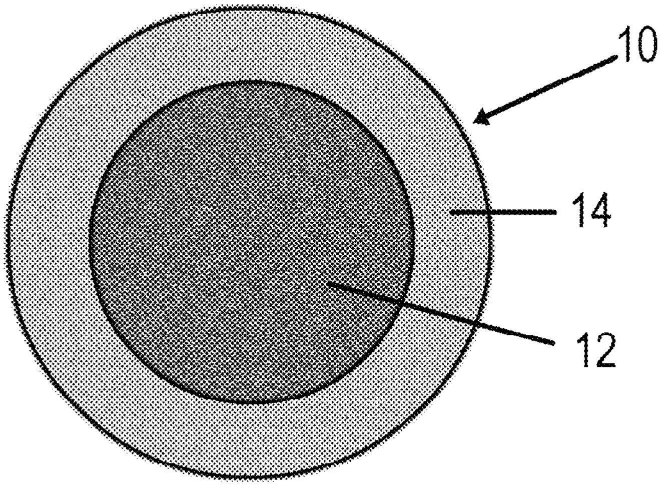
FIG. 1 PRIOR ART
FIG. 1 is a cross-sectional view of a prior art string with a round core wire.
Figure 2:
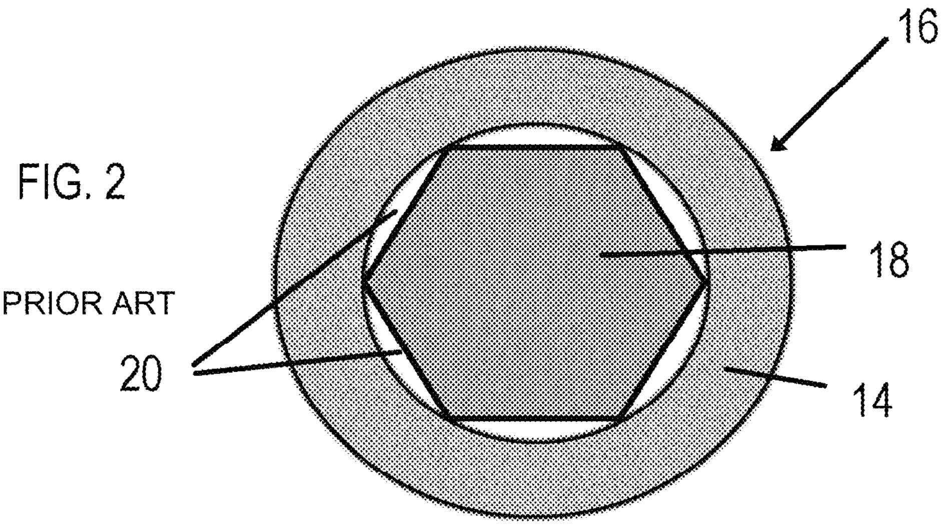
FIG. 2 PRIOR ART
FIG. 2 is a cross-sectional view of a prior art string with a hexagonal core wire.
Figure 6:
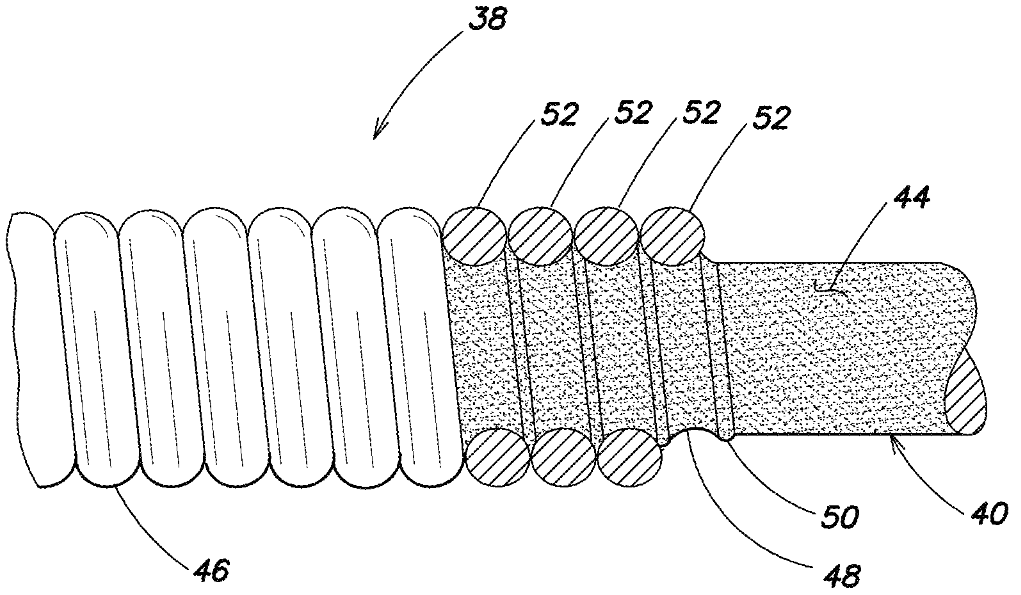
FIG. 6 is another view of the string produced by the method in accordance with the invention.

Moreover, the coating 44 must be provided during the winding of the wrap wire 46 about the core wire 40, and as a result of the selected winding conditions, with a helical imprint or impression 48 into which the wrap wire 46 is seated (see FIGS. 5 and 6). The impression 48 alters the cylindrical outer surface of the core wire 40 which is constituted by the outer surface of the coating 44 and creates an outer surface of the core wire 40 that is channeled or grooved. This impression 48 is caused by the winding of the wrap wire 46 and serves a very important purpose in that the impression 48 prevents movement of the wrap wire 46 along the length of the core wire 40, i.e., axial movement of the wrap wire 46. The effect obtained is similar to that of a prior art string with a hexagonal core shown in FIG. 2, but without the attendant disadvantages of a hexagonal core mentioned above. Rotation of the wrap wire 46 on the core wire 40 is still possible, i.e., the wrap wire 46 can helically move along the imprint or impression 48.

A significant advantage of the formation of the helical imprint or impression 48 is that the coating 44 is pushed upward by the wrap wire 46 and fills void between adjacent windings of the wrap wire 46 and under the wrap wire 46. Ridges 50 are thus formed in the coating 44 that fill such voids (see FIGS. 5 and 6). This is in addition to maintaining at least partial covering of the core 42. By filling of these voids, foreign material or particles are therefore prevented from passing between adjacent windings of the wrap wire 46 since there is no space between the adjacent windings into which the foreign materials or particles can pass. This enables strings 38 produced by the methods in accordance with the invention to maintain their cleanliness and prevent sound degradation, as well as increases the life span of string performance.

Important to realize is that there is no glue or other adhesive used to connect the wrap wire 46 to the core wire 40 along the playing area of the string or elsewhere. Glue or adhesive creates problems, or at least issues, with sound quality and also adds manufacturing concerns.

Preventing penetration of the wrap wire 46 through the entire coating 44 may be ensured through a trial and error process. Initially, winding conditions are set and the resultant string 38 is analyzed to assess whether the wrap wire 46 penetrated down to the core 42, i.e., whether there is contact between the wrap wire 46 and the core 42. If there is contact, then the winding conditions can be adjusted, e.g., lower the tension during the wrap wire winding stage. This feedback process can continue until winding conditions are determined that avoid penetration of the wrap wire 46 through the coating 44 into contact with the core 42, yet create the helical impression in the coating 44.

In step 30, the wrapped string is removed from the winding machine and prepared for sale and use. Such preparation may involve trimming the string 38, polishing the string 38, and other final preparatory steps and processes typically performed on musical instrument strings to prepare them for sale and use.

Advantages of the string manufacturing method described above, sometimes referred to as a string with COATED CORE TECHNOLOGY™, is that the wrap wire 46 is impressed into the coating 44, and an anchor is no longer necessary because the wrap wire 46 rides into the helical groove or impression 48 created by the wrap wire 46 along or through the length of the string 38 removing the risk of the wrap wire 46 becoming loose from the core wire 40 while maintaining the characteristics of a round core string. As to the first advantage, the wrap wire 46 will seat into the impression 48, thereby aiding in eliminating the problem of having an unbalanced string.

Moreover, the coating 44 remains over the entire core 42, although its thickness now varies. The coating 44 therefore continues to protect the core 42 from galvanic effect.

The flow of the coating 44 causes filling of voids under and between the coiled wrap wire 46 to protect the string 38 from foreign particles which cause the string to become dead sounding. In a preferred embodiment, the tension and winding speed of the wrap wire 46 as well as the tension of the core wire 40 are selected to be sufficient to cause the coating 44 of the core wire 40 to be pressed upward during the winding of the wrap wire 46 to a position between the adjacent turns of the wrap wire 46, while also filling spaces 52 between the adjacent turns of the wrap wire 46 without leaving a void below the adjacent windings of the wrap wire 46 and without the material of the coating 44 passing between the adjacent windings of the wrap wire 46 to a position above the adjacent windings of the wrap wire 46.

Removal of over tones produced during use of the string 38 is another advantage of the method for producing strings without voids and spaces between windings of the wrap wire 46 as described herein.

Impression of the coating 44 into which the wrap wire 46 is seated, and not adhesion resulting from glue or another adhesive between the wrap wire 46 and the coating 44, allows the wrap wire 46 to rotate on the core wire 40 for increased flexibility and quality of sound. This is because adhesion of the wrap wire 46 to the coating 44 of the core wire 40 through the use of glue or another adhesive affects the sound and flexibility of a string in a negative way, i.e., adversely. Among other things, such adhesion hinders the ability of the string to vibrate properly because the entire string becomes one solid mass. Maintaining the wrap wire 46 in contact with the core wire 40 without glue or another adhesive does not result in the formation of a single solid mass, and thereby is believed to improve the vibratory properties of the string 38 in accordance with the invention.

Various parameters may be set for the winding machine to manufacture a string 38 in accordance with the invention, and the following are provided as examples only without intending to limit the invention. Indeed, as non-limiting examples, the tension on the core wire 40 may be from about 10 lbs to about 25 lbs depending on factors such as size of the string and material used. The winding speed may be from about 12,000 rpm to about 24,000 rpm, depending on factors such as size of the string and material used. The tension on the wrap wire 46 during winding may be from about 7 oz to about 40 oz, depending on factors such as the size of the string 38 and material used.

One of the parameters that may also be controlled to effect the desired winding conditions disclosed above is heat. That is, the core wire 40 and/or wrap wire 46 may be heated to allow the coating 44 to flow as the wrap wire 46 is wound or coiled about the core wire 40 (step 32 effected before or in conjunction with the winding step 28 in FIG. 3). In one embodiment, the core wire 40 and/or the wrap wire 46 may be heated in step 32 in some circumstances to aid in the formation of the impression 48 to a temperature of between about 150 degrees Fahrenheit to about 450 degrees Fahrenheit. Another possible higher range is from about 302 degrees Fahrenheit to about 842 degrees Fahrenheit. It is possible in some embodiments to heat only one of the wires, e.g., only the core wire 40 or only the wrap wire 46, or to heat both of the wires 40, 46 to either approximately the same temperature or different temperatures. It may also be possible in other embodiments to heat only the coating 44 of the core wire 40 without heating the core 42 of the core wire 40, and then optionally also heating the wrap wire 46 if so desired.

The heating process is achieved by any conventional heating apparatus that may be operative or active on the core wire 40, the coating 44 of the core wire 40, and/or the wrap wire 46 prior to entry of the wire or wires into the winding machine or positioning of the core wire 40 and/or wrap wire 46 into the winding machine. The heating apparatus may also be integrated into the winding machine to heat the wire(s) 40, 46 or coating 44 of the core wire 40 at the moment of or directly before the moment of winding or coiling of the wrap wire 46 about the core wire 40. If the core wire 40 is heated, then the coating 44 thereon will also be directly heated, whereas if the wrap wire 46 is heated, then heat to the coating 44 will be provided as the wrap wire 46 is brought into contact with the coating 44 on the core wire 40.

This flowability of the coating 44 may this be determined by a combination of factors including heat and pressure derived from the treatment of the core wire 40 and/or the wrap wire 46 and/or the operating parameters of the winding machine. Limits on the heat and/or pressure may be determined to avoid excessive flowing of the coating, e.g., through spaces between adjacent windings of the wrap wire 46.

The invention is not limited to winding a single wrap wire 46 about a core wire 40, and it is conceivable that any other numerical relationships of core wires to wrap wires may be formed in accordance with the method disclosed above, e.g., two wrap wires 46 about a common core wire 40 and which are alongside one another.

In conclusion, one of the aspects recognized by the inventor is that it is possible to achieve superior string performance results of winding of a wrap wire about a hexagonal core wire without the attendant disadvantages of the use of a hexagonal core wire. Rather, a round core wire may be used but the winding conditions controlled to cause a change in the coating of the core wire. This change improves the characteristics of the string produced by the winding, as disclosed above.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

As an example, it is the inventor's realization that any of the above-disclosed processes may be used on other shaped core wires, e.g., hexagonal or octagonal, or other cross-sectional shapes, in order to achieve other tensions or sounds. Such different core-shaped wires would include a coating around which a wrap wire is coiled or wound. Thus, the invention is not limited to the presence of a circular core wire, although this is likely to be one of the preferred embodiments.

The invention claimed is:

1. A method for manufacturing a musical instrument string, comprising:

positioning an elongate wrap wire in a position to be wound about an elongate core wire having an outer surface, the core wire including a core and a coating surrounding the core; then performing the winding of the wrap wire about the core wire under winding conditions to cause the wrap wire to form a helical impression in the coating surrounding the core of the core wire, the wrap wire being seated in the helical impression, and selecting the material of the coating to enable the coating to flow and form the helical impression and move upward into spaces between adjacent windings of the wrap wire.

2. The method of claim 1, further comprising heating at least one of the core wire and the wrap wire before or in conjunction with the step of performing the winding of the wrap wire about the core wire.

3. The method of claim 2, wherein the at least one of the core wire and the wrap wire is heated before or in conjunction with the step of performing the winding of the wrap wire about the core wire to a temperature in a range from about 150 degrees Fahrenheit to about 450 degrees Fahrenheit.

4. The method of claim 1, wherein the thickness of the coating is from about 0.00015 inches to about 0.0008 inches.

5. The method of claim 1, wherein the step of positioning an elongate wrap wire in a position to be wound about an elongate core wire comprises positioning the wrap wire and the core wire in a string winding machine.

6. The method of claim 1, wherein the step of performing the winding of the wrap wire about the core wire under winding conditions to cause the wrap wire to form a helical impression in the coating comprises selecting at least one of tension on the core wire, tension on the wrap wire and winding speed to provide the winding conditions.

7. The method of claim 6, wherein the tension on the core wire is from about 10 lbs to about 25 lbs, the winding speed is from about 12,000 rpm to about 24,000 rpm, and the tension on the wrap wire is from about 7 oz to about 40 oz.

8. The method of claim 1, wherein the step of performing the winding of the wrap wire about the core wire under winding conditions to cause the wrap wire to form a helical impression in the coating comprises winding the wrap wire about the core wire without penetrating the coating entirely to prevent contact between the wrap wire and the core of the core wire.

9. The method of claim 1, wherein the step of performing the winding of the wrap wire about the core wire under winding conditions to cause the wrap wire to form a helical impression in the coating is performed without glue or another adhesive between the wrap wire and the core wire.

10. The method of claim 1, further comprising selecting the core wire with a core made from phosphor bronze, brass, copper, hi-carbon steel, lo-carbon steel, stainless steel, nickel-plated steel, cobalt, silver-plated steel, silver-plated copper, aluminum or Monel Pure Nickel.

11. The method of claim 1, further comprising selecting the wrap wire from wires made from phosphor bronze, brass, copper, hi-carbon steel, lo-carbon steel, stainless steel, nickel-plated steel, cobalt, silver-plated steel, silver-plated copper, aluminum or Monel Pure Nickel.

12. The method of claim 1, further comprising providing the wrap wire with a coating.

13. The method of claim 1, wherein the core wire has a round core and the outer surface is cylindrical, and a coating on the outer cylindrical surface with a uniform thickness prior to performing the winding of the wrap wire about the core wire under winding conditions to cause the wrap wire to form the helical impression in the coating.

14. A musical instrument string, comprising:
- an elongate wrap wire; and
- an elongate core wire including a core and a coating surrounding said core,
- said coating of said core wire including a helical impression in which said wrap wire is situated,
- whereby said wrap wire is movable in the helical impression relative to said core wire,
- said coating of said core wire being of a material to enable said coating of said core wire to flow and form the helical impression and move upward into spaces between adjacent windings of said wrap wire.

15. The string of claim 14, wherein said core is made from phosphor bronze, brass, copper, hi-carbon steel, lo-carbon steel, stainless steel, nickel-plated steel, cobalt, silver-plated steel, silver-plated copper, aluminum or Monel Pure Nickel.

16. The string of claim 14, wherein said wrap wire is made from phosphor bronze, brass, copper, hi-carbon steel, lo-carbon steel, stainless steel, nickel- plated steel, cobalt, silver-plated steel, silver-plated copper, aluminum or Monel Pure Nickel.

17. The string of claim 14, wherein a thickness of said coating is from about 0.00015 inches to about 0.0008 inches.

18. The string of claim 14, wherein said coating is entirely interposed between said core and said wrap wire such that there is no contact between said core and said wrap wire.

19. The string of claim 14, wherein there is no bonding between said wrap wire and said coating of said core wire which would prevent said wrap wire from moving along the helical impression relative to said core wire.

20. A method for manufacturing a musical instrument string, comprising:
- positioning an elongate wrap wire in a position to be wound about an elongate core wire having an outer surface, the core wire including a core and a coating surrounding the core; then
- performing the winding of the wrap wire about the core wire under winding conditions to cause the wrap wire to form a helical impression in the coating surrounding the core of the core wire, the wrap wire being seated in the helical impression, and
- wherein the step of performing the winding of the wrap wire about the core wire under winding conditions to cause the wrap wire to form a helical impression in the coating comprises selecting at least one of tension on the core wire, tension on the wrap wire and winding speed to provide the winding conditions, and
- wherein the tension on the core wire is from about 10 lbs to about 25 lbs, the winding speed is from about 12,000 rpm to about 24,000 rpm, and the tension on the wrap wire is from about 7 oz to about 40 oz.

* * * * *